W. J. STEVENS.
Coupling for Hose and Other Pipes.

No. 223,183. Patented Dec. 30, 1879.

Witnesses
John Becker

Inventor

UNITED STATES PATENT OFFICE.

WILLIAM J. STEVENS, OF NEW YORK, N. Y., ASSIGNOR OF ONE-HALF OF HIS RIGHT TO WILLIAM F. PROCTOR, OF SAME PLACE.

IMPROVEMENT IN COUPLINGS FOR HOSE AND OTHER PIPES.

Specification forming part of Letters Patent No. 223,183, dated December 30, 1879; application filed November 28, 1879.

*To all whom it may concern:*

Be it known that I, WILLIAM J. STEVENS, of New York, in the county and State of New York, have invented certain new and useful Improvements in Couplings for Hose and Pipes, of which the following is a specification.

My invention relates to improvements in couplings for which I filed an application for Letters Patent of the United States dated May 23, 1879; and the object of this invention is to provide a coupling which may be employed in connection with steam, air, or vacuum brakes.

To this end my invention consists in a coupling the two parts of which correspond in shape, each being half male and half female, and are each provided with a cylindrical socket, a partly-tubular extension adapted to enter the cylindrical socket of the other part, a ball-valve, a pocket or cavity for the reception of such valve when the latter is open, and two seats for said valve, one upon each side of said pocket or cavity, to either of which said valve may pass. One of said seats in each part of the coupling may be formed in the coupling, while the other seat is formed by the insertion of a sleeve or bush after the valve is in place, which forms the cylindrical socket of the coupling.

Figure 1:
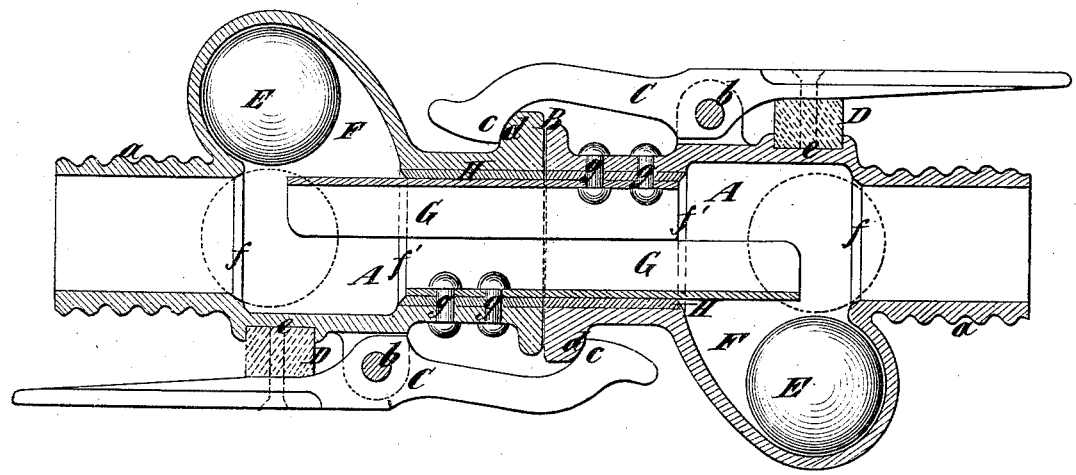
Figure 2:
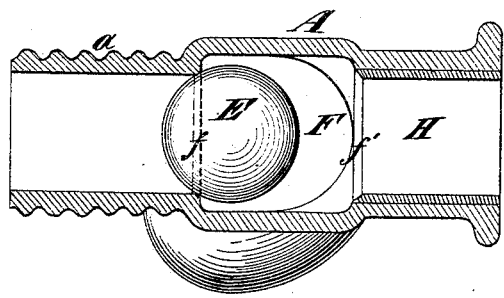
Figure 3:
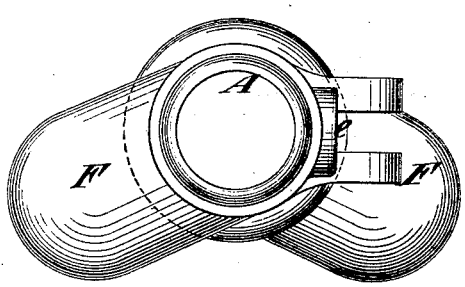

In the accompanying drawings, Figure 1 represents a horizontal section through a coupling embodying my invention. Fig. 2 represents a vertical section of one of the parts of the coupling, and Fig. 3 represents an end view thereof.

Similar letters of reference designate corresponding parts in all the figures.

A A designate the two parts or sections of which my coupling is composed, and which are provided upon their ends with corrugations $a$, in order to facilitate securing hose upon them. The two parts A A correspond in shape each with the other, and are each half male and half female, so that either of the parts may be used with either of the parts of a corresponding coupling. The ends of the two parts or sections may be faced, so as to form a butt-joint, as represented at B; or a rubber or other packing-ring may be inserted between them for the purpose of preventing the leakage of air.

Each of said parts or sections is provided with a lever, C, pivoted at $b$ to lugs projecting from the coupling, and provided upon its end with a hook, $c$, adapted to engage with a lip, $d$, upon the other of said parts or sections. The hook $c$ and the lip $d$ are so shaped that upon pulling the two parts or sections in different directions they may be disengaged; but when not so pulled the parts will be held in tight face-to-face contact.

For the purpose of holding the hooks $c$ in engagement with the lips $d$, I employ springs D, resting in recesses $e$ upon the coupling.

Each of said parts or sections is also furnished with a valve, shown as consisting of a ball, E, of india-rubber or other material, and adapted, when the parts of the coupling are separated, to close the pipe by resting in one of the two valve-seats $f\,f'$, as represented in dotted outline in Fig. 1. The seat $f$ is formed in the casting forming the part of the coupling, while the seat $f'$, situated upon the opposite side of the pocket or cavity F, is formed by a tubular sleeve or thimble, H, which fits within the cylindrical part of the coupling, and is removable to permit the valve E to be inserted.

When the two parts or sections are coupled the valves rest in the pockets or cavities F, and thus afford an uninterrupted passage through the hose or pipes.

The parts A A are each provided with a cylindrical socket (here shown as formed by the sleeve or thimble H) and a partly-tubular extension, G, adapted to fit within the cylindrical socket of the other part. The said extensions G also form stops, adapted, when the parts of the coupling are connected, to partly or wholly close the said pockets or cavities for the purpose of retaining the valves therein.

The stops G are here represented as semi-tubular pieces of metal secured in the coupling by means of rivets $g$, and as they together form a cylindrical brace extending across the joint B, the leakage of air is in a great measure prevented and the coupling strengthened.

It is also obvious that each part of the coupling is adapted to be used in connection with a similar part of any other coupling, and hence the hose or pipe carried by one railway-car may be coupled with either end of a hose or pipe carried by an adjacent car. The double seat $f\ f'$ also enables the coupling to be used with equal facility whether the brake is operated by vacuum or pressure.

When the stops G are formed of semi-tubular pieces of metal, with their adjacent edges impinging against each other, either part A is precluded from turning independently of the other part.

What I claim as my invention, and desire to secure by Letters Patent, is—

1. A coupling the two parts of which correspond in shape, being each half male and half female, and are each provided with a cylindrical socket, a partly-tubular extension adapted to enter the cylindrical socket of the other part, a ball-valve, a pocket or cavity for the reception of said ball-valve when the latter is open, and two seats for said valve, one upon each side of said pocket or cavity, to either of which said valve may pass, substantially as and for the purpose specified.

2. The coupling composed of two parts, A A, each of which is provided with a ball-valve, E, a pocket or cavity, F, for the reception of said valve when open, the seat $f$, and the sleeve or thimble H, removable to permit the insertion of the valve, and forming a seat, $f'$, therefor, substantially as and for the purpose specified.

W. J. STEVENS.

Witnesses:
 FREDK. HAYNES,
 E. P. JESSUP.